United States Patent [19]

Brog

[11] 4,337,278

[45] Jun. 29, 1982

[54] IMITATION MILK

[76] Inventor: Roy A. Brog, 1600 N. Main, Logan, Utah 84321

[21] Appl. No.: 185,534

[22] Filed: Sep. 9, 1980

[51] Int. Cl.$^3$ ............................................. A23C 11/00
[52] U.S. Cl. .................................... 426/583; 426/588; 426/585
[58] Field of Search .............. 426/580, 583, 585, 590, 426/801, 588

[56] References Cited

U.S. PATENT DOCUMENTS

| | | | |
|---|---|---|---|
| 746,502 | 12/1903 | Hall | 426/585 |
| 2,604,403 | 7/1952 | Wiechers | 426/585 |
| 2,699,995 | 1/1955 | Hull | 426/583 |
| 2,923,628 | 2/1960 | Otto | 426/580 |
| 3,560,220 | 2/1971 | Bangert | 426/583 |
| 3,642,492 | 2/1972 | Arndt | 426/583 |
| 3,642,493 | 2/1972 | Arndt | 426/583 |
| 3,896,240 | 7/1975 | Gruette et al. | 426/583 |
| 3,911,143 | 10/1975 | Colmey et al. | 426/583 |
| 3,943,264 | 3/1976 | Davis | 426/583 |
| 4,031,261 | 6/1977 | Durst | 426/580 |
| 4,046,926 | 9/1977 | Gardiner | 426/585 |
| 4,143,174 | 3/1979 | Shah | 426/583 |
| 4,216,236 | 8/1980 | Müeller | 426/801 |

*Primary Examiner*—Jeanette M. Hunter

[57] ABSTRACT

An imitation milk composition useful as a beverage containing comprising a 40 to 60% of a sweet whey base combined with lesser amounts 4 to 10% of a soluble casein salt, 5 to 35% of an edible vegetable oil and an added sugar or artifical sweetener. The weight ratio of whey protein to casein salt is approximately 1:1, and the ratio of sugar to lactose in the whey approximately 1:1.

13 Claims, No Drawings

IMITATION MILK

BACKGROUND OF THE INVENTION

This invention relates to an imitation milk product having the simulated flavor and texture of milk. More particularly, this invention relates to an imitation milk product having a whey base to which has been added non-dairy ingredients to provide the appropriate texture and flavor.

Whey is broadly defined as the by-product obtained from the manufacture of cheese. Sweet whey is obtained from the manufacture of swiss, mozzarella, Monterey Jack, cheddar, and similar types of cheeses resulting from the action of rennin on casein. The principal components of whey are milk sugar (lactose) and soluble milk protein (lactalbumin). Milk salts which contain calcium, sodium, potassium and phosphate ions are also present as are minor amounts of fat. The cheese from which whey is a by-product consists almost entirely of precipitated milk fat and protein (casein).

Of the milk proteins, casein is much more prevalent in milk than lactalbumin, e.g. from three to five times as great. When the fat and casein have been removed during the cheese making process, essentially all of the remaining milk ingredients remain in the whey. The whey solids comprise only about 7% by weight with the remainder being water.

Many authorities of nutrition have recognized the value of whey solids which consist of about 10–14% protein, primarily lactalbumin, 70–75% lactose, 7–10% salts, 0–1% fat with some enzymes and vitamins, the remainder being moisture. Athletes and consumers of health foods use whey-based powders and products and claim to derive curative, nutritional and health protective benefits. However, products based on whey, and beverages in particular, are unpalatable to humans because of the taste imparted by the whey. As a result, this product is relatively inexpensive and is used primarily as an animal feed or dumped as a waste product creating a sewage disposal problem.

Some attempts have been made to provide a synthetic milk utilizing whey solids. U.S. Pat. No. 2,923,628 which issued of Feb. 2, 1960 teaches a combination of whey solids with lecithin and safflower seed oil and other minor ingredients.

A more recent patent relating to a simulated milk product containing whey solids is U.S. Pat. No. 3,642,493 which issued Feb. 15, 1972. This patent claims a combination of whey along with isolated vegetable protein and vegetable oil wherein the proportions of vegetable protein, vegetable oil and whey are in the same range as the casein, butter fat and whey that are in whole milk. A special processing step is required to prepare the protein.

Whey solids have also been incorporated into such edible compositions as granishes, toppings, and dressings of the sour cream type as taught in U.S. Pat. No. 3,560,220 which issued Feb. 2, 1971. Acid whey solids, such as obtained from cottage cheese manufacture, are used with an animal or vegetable fat being the major ingredient.

U.S. Pat. No. 3,560,220 also mentions the use of water soluble casein, i.e. sodium caseinate. This product is manufactured from casein by treating it with sodium hydroxide. The sodium caseinate salt thus obtained is generally considered to be a "non-dairy" product and contains from about 0.3 to 3.0 percent by weight sodium ions.

Sodium caseinate, vegetable oils and an added carbohydrate are the basic ingredients of "non-dairy" creamers such as taught in U.S. Pat. No. 4,046,926 which issued Sept. 6, 1977, but are not generally drinkable for beverage purposes because of the high fat content used to provide the creamy texture.

Although sodium caseinate and whey have been used in food products, they have not, heretofore, been used together to provide a palatable similated milk beverage. Each of these products is derived from milk but is considered to be a milk by-product and is often classified as being "non-dairy." Their use together has only been considered suitable as a substitute for non-fat milk solids in chemically leavened baked goods such as is taught in U.S. Pat. No. 3,943,264 which issued Mar. 9, 1976. Such a product is marketed by Kraft Inc. of Memphis, Tenn. as a non-fat milk "alternate" under the registered trademark Cake Classic.

OBJECTS AND SUMMARY OF THE INVENTION

It is an object of the present invention to provide a palatable imitation milk useful as a beverage, the major ingredient of which is sweet whey solids.

It is also an object of the present invention to provide an imitation milk containing a protein which is a mixture of dairy derived by-products consisting of a processed soluble casein salt and whey protein in a substantially equal weight ratio.

Another object of the invention is to provide an imitation milk having a whey base combined with non-dairy products which has the flavor and texture of milk and which may be utilized as a powder or as a reconstituted liquid.

These and other objects may be accomplished by means of a composition having a solids content consisting of a major proportion of whey solids to which has been added balanced amounts of a soluble casein salt, a vegetable oil and a non-dairy derived sweetener. Other additives such as emulsifiers, stabilizers, gums, flavors, vitamins and minerals may also be added. By balanced amount is meant the amounts of soluble casein salt, vegetable oil and sweetener which must be added to the whey solids to provide a palatable product which is nutritionally equal or superior to bovine milk which may be used in either a dry or liquid state and which has the appearance and texture of milk.

The balance between the whey proteins, i.e. lactalbumin and lactoglobulin, and soluble casein salt, i.e. sodium caseinate, has been found to be a primary factor in contributing to the palatability of the product as will be hereinafter detailed. The combination of the lactose, from the whey, with other sugars or artificial sweetener sources is also of importance in balancing the flavor and taste of the product. The vegetable oil, which is free of cholesterol, adds to the texture and creaminess of the imitation milk and may be utilized in such proportions as to provide imitation skim, low fat or whole milk.

The imitation milk product, as will now be described in detail, not only duplicates the color, flavor and consistency of milk but is considerably less expensive to produce.

DETAILED DESCRIPTION OF THE INVENTION

The product of this invention is prepared by the admixing of four basic components, i.e. sweet whey solids, a soluble casein salt, a sugar or artificial sweetener and a vegetable fat to prepare a simulated milk product providing carbohydrates, proteins, fats and minerals as nutrients. One basic difference between the imitation milk product of the invention and bovine milk is that the ratios of carbohydrate and protein are somewhat altered although the taste and texture are the same. The carbohydrate content is higher and the protein is lower for the imitation milk as compared to cow's milk. All product ingredients will be reported as a weight ratio or percent by weight based on a simulated imitation milk powder or solids. The powder can be diluted with water to provide a fluid imitation milk or can be used directly in any application as a substitute for powdered milk.

The protein content of the imitation milk is a mixture of proteins derived from milk by-products. The processing of milk to obtain casein and the subsequent treatment of casein to form a soluble caseinate are both well known procedures. Sodium and calcium caseinate are commercial products.

Also, the processing of whey to obtain whey solids is known and whey powder is commercially available. Typically, whey solids contain from about 10 to 14% by weight protein. This protein is primarily lactalbumin with some lactoglobulin also being present.

By mixing a soluble caseinate salt with the whey in a weight ratio such that the ratio of caseinate to whey protein is from about 0.8:1 to 1.2:1 it has been found that the objectionable flavor associated with whey is effectively neutralized. Just why the approximately equal ratios of caseinate salts with whey protein renders a whey based mixture palatable is not known. In milk, from which no protein has been removed, the ratio of casein to other milk proteins is about 4:1. In other words, about 80% by weight of milk protein is casein.

The imitation milk powder will have a protein content of about 10 to 18% by weight. In order to prepare such a product the whey solids will comprise approximately 40 to 60% by weight of the imitation milk and the soluble casein salt, preferably sodium caseinate, will be present in amounts ranging from about 4 to 10%. The sodium caseinate not only helps to neutralize the whey flavor, but also adds a white color to the mixture. Moreover, the sodium caseinate, being water soluble also provides stability to a fluid suspension of the imitation milk blend when admixed with water.

Any off flavor from the whey remaining after admixing the aforementioned ratios of soluble casein salt with whey solids can be essentially completely overcome by the addition of a sugar separate from the lactose contained in the whey. However, the usage of added purified or refined lactose is not to be precluded. Any of the conventional commercially available sugars such as sucrose, fructose, dextrose or glucose may be utilized. In theory, any of the mono- or disaccharides derived from the hexoses such as glucose, fructose, galactose, mannose, sucrose, maltose and lactose may be used. In the alternative a synthetic sweetener such as saccarin or cyclamate salts having the sweetening power equivalent to the amount of sugar which would normally be added may be used in the place of sugar.

While the amount of added sugar is somewhat limited by the requirements of the other ingredients, it has been found that the ratio of added sugar to the lactose from the whey should be at least 0.4:1 and may be considerably higher. Ratios as high as 1:1 may be utilized; however, the preferred ratio is from about 0.6:1 to 0.8:1. The overall sugar content, i.e. whey sugar plus added sugar, will generally vary from about 40 to 80% by weight of the total imitation milk composition with the added sugar comprising 10 to 40%.

A preferred sugar additive is corn syrup solids.

While fat is listed as a fundamental ingredient in the imitation milk of this invention, its usage is not essential to the palatability of the product. An edible vegetable oil, which is free from cholesterol, is added to provide the imitation milk with a milk-like texture and color. The higher the vegetable fat content is the whiter the product appears to be and the more creamy it becomes when diluted with water. It is generally desired to prepare an imitation fluid milk which is either a "low-fat" e.g. 0.5–2% fat, or "skim" e.g. 0.5 or less fat, milk substitute. However, an imitation whole milk containing 3% or more fat may also be prepared. The solids content of fluid imitation milk prepared from the powder of this invention will usually be less than found in a comparable milk and will generally vary from about 8% for an imitation skim milk to about 11% for an imitation whole milk. In order to add an adequate amount of fat to prepare a powder which can be diluted to a skim, low-fat or whole imitation milk, the fat content of the powder product may vary from about 5 to 35% by weight. Any edible vegetable oil may be incorporated into the imitation milk product. Oils which have been found to be particularly useful in providing proper color and texture to the imitation milk product are partially hydrogenated coconut and soy oils or mixtures of the two.

Many political divisions have laws relating to the addition of vegetable oils to milk, cream or skimmed milk to prepare a product which may be passed off as a milk product. These "filled milk" statutes are primarily designed to assist the dairy farmer and prevent the consumer from being deceived as to what he or she is buying. One of the advantages of the present invention is that it benefits both the dairy farmer and the consumer. Whey solids are plentiful and the cheese maker has a need for a market for the whey. The more whey the cheese maker may dispose of the more cheese he may make and the more milk the dairy farmer can produce. Moreover, sodium caseinate is also a milk by-product and its usage creates an increased market for the dairy farmer. On the other hand, whey is relatively inexpensive and the imitation milk of this invention is generally less costly than milk.

Since whey solids and sodium caseinate are separately obtained milk by-products, their combination with vegetable oil does not constitute a "filled milk" but rather provides a composition of combined ingredients. Hence, the product of this invention is not considered to be a dairy product under the "filled milk" statutes. The present product may be labeled as a milk substitute, a milk alternate, an imitation milk or a synthetic milk and should be designated as such to the consumer.

The whey solids contribute almost all of the inorganic matter found in the final product. Calcium is the predominant mineral; however, potassium, sodium and magnesium are also found to be present in varying degrees. Trace amounts of iron and copper may also be present. Phosphorous and chlorine are also present as inorganic constituents. Overall, the inorganic content of the imitation milk product will generally vary somewhere between about 2 and 8% by weight.

Other ingredients which generally will comprise not more than 1% by weight of the imitation milk product may also be compounded with the above ingredients. Stabilizers, emulsifying agents, thickenings agents, wetting agents and the like may be added to promote the dispersibility and suspendability of the various components. Typical of such ingredients are dipotassium and calcium phosphates, carrogeenan, lecithin, gaur gum, xanthan gum, cellulose ethers, gelatin and the like. Calcium lactate or sulfate may be added as calcium builders Vitamin A and D, which are generally added to fortify milk, may also be included. Flavoring agents may be utilized as desired. For example, it may be desirable to add chocolate and added sugar to provide an imitation chocolate milk.

The product may also contain buffers to maintain the pH of the product within the optimum range of 6.7 to 7.1. However, the pH may vary from about 6 to 7.5 without any appreciable loss in flavor. Appropriate pH's may be obtained by the addition of minor amounts of a hydroxide or carbonate as the product will generally be adjusted from a more acid pH to a more basic one.

The product is preferably prepared in a two-step process. First, the sodium caseinate, fat, sugar and additives are dry blended together and thoroughly mixed. The mixed ingredients are then dry blended with the whey solids.

The blended powders may be treated by agglomeration to increase their wetability and dispersability.

In the alternative, an aqueous solution of the blended ingredients may be spray-dried to provide a powdered product which will be readily reconstituted to form a fluid imitation milk.

The product may also be made and distributed in fluid form. As a fluid it may be subjected to homogenization and pasteurization in the same manner as fluid milk. In some instances, it may be advantageous to homogenize and pasteurize a fluid product followed by spray or flash drying to obtain a powdered product.

The imitation milk has excellent storage capabilities in powdered form and has a shelf life as a liquid product equals or exceeds its fluid milk counterpart.

The following examples are but illustrative of the invention.

EXAMPLE I

Low-Fat Imitation Milk

A dry blend was made by combining 6.5 parts by weight sodium caseinate with 27 parts by weight corn syrup solids. To this mixture was added 17 parts by weight of a partially hydrogenated coconut oil and 1 part by weight stabilizer and flavoring. This product was thoroughly mixed in a ribbon blender. To the above product was blended 48.5 parts by weight whey solids containing 37 parts by weight lactose, 6.5 parts by weight protein and 5 parts by weight minerals and inorganics.

EXAMPLE II

The product of Example I was diluted with water by mixing 12 oz. of powder per gallon of water. The product was mixed in water at about 125° F., homogenized, pasteurized and then allowed to chill to about 40° F. The imitation milk contained about 100 calories per 8 oz. cup and had 3 grams protein, 14 grams carbohydrate and 4 grams fat per serving. The product was served in an experimental test at a college dormitory. Of the 300 students given the imitation milk instead of regular low-fat milk, not one could detect that the product was, in fact, imitation.

EXAMPLE III

Imitation Skim Milk

A dry blend was prepared as in Example I with the following composition:

| INGREDIENT | PARTS BY WEIGHT |
| --- | --- |
| Sodium Caseinate | 7.5 |
| Corn Syrup Solids | 31.3 |
| Partially Hydrogenated Coconut Oil | 5.0 |
| Additives | 1.0 |
| Whey Solids | 56.2 |
| (Lactose) | (42.7) |
| (Protein) | (7.5) |
| (Minerals) | (6.0) |

This product was made into an imitation skim milk by mixing 10.5 oz. of powdered product per gallon of water as in Example II. The fluid product contained 3 grams protein, 14 grams carbohydrate and 1 grams fat per 8 oz. cup.

EXAMPLE IV

Imitation Whole Milk

A dry blend was again prepared as in Example I having the following composition:

| INGREDIENT | PARTS BY WEIGHT |
| --- | --- |
| Sodium Caseinate | 5.5 |
| Cane Sugar | 22.5 |
| Partially Hydrogenated Soy Oil | 30.0 |
| Additives | 1.0 |
| Whey Solids | 41.0 |
| (Lactose) | (31.5) |
| (Protein) | (5.5) |
| (Minerals) | (4.0) |

Following the procedure of Example II, 14.25 oz. of powdered product were mixed with a gallon of water. The imitation milk contained 3 grams of protein, 14 grams of carbohydrate and 8 grams of fat per 8 oz. serving.

EXAMPLE V

Imitation Low-Fat Chocolate Milk

To 12 oz. of the dry product of Example I was blended 5.3 oz. of a commercial sugar chocolate blend and 0.12 oz. of a xanthane gum stabilizer in a ribbon blender. The blended product was diluted with water to one gallon and was found to have excellent taste and stability when being utilized as either a hot or cold beverage.

While sweet whey from the manufacture of any hard cheese by the action of rennin on casein may be used, it is preferred to use a whey resulting from the manufacture of white cheese such as swiss, mozzarella and Monterey Jack. Minor amounts of modified whey having a higher protein content may also be used as long as the ratios of whey protein to soluble casein salt remain within the above-described bounds.

The above description and examples may be modified to produce a variety of imitation milk beverages which come within the scope of the invention. The invention is limited in scope only by the appended claims.

I claim:

1. An imitation milk composition having a solids content consisting essentially of 40 to 60% by weight of sweet whey solids, 4 to 10% by weight of a soluble casein salt, 10 to 40% by weight sugar and 5 to 35% by weight of an edible vegetable oil wherein the weight ratio of soluble casein salt to the protein in the whey may vary from about 0.8:1 to 1.2:1 and wherein the weight ratio of sugar to lactose contained in the whey may vary from about 0.4:1 to 1:1.

2. An imitation milk composition according to claim 1 wherein the soluble casein salt is sodium caseinate.

3. An imitation milk composition according to claim 2 wherein the edible vegetable oil is a partially hydrogenated oil selected from the group consisting of coconut oil, soy oil and combinations thereof.

4. An imitation milk composition according to claim 3 wherein the sugar is corn syrup solids.

5. An imitation milk composition according to claim 4 wherein product additionally contains from about 0.5 to 1.0% by weight of additives selected from the group consisting of gums, emulsifiers, stabilizers, wetting agents, vitamins and flavorings.

6. An imitation milk composition according to claim 5 wherein the product is a powdered solid.

7. An imitation milk composition according to claim 6 wherein the powdered solid is derived from a homogenized and pasteurized liquid.

8. An imitation milk composition according to claim 6 wherein the product has been treated by agglomeration to increase its wetability and dispersability.

9. An imitation milk composition according to claim 5 wherein the product is a liquid consisting of 89 to 92% by weight water containing from 8 to 11% by weight solids.

10. An imitation milk composition according to claim 9 which has been pasteurized and homogenized.

11. An imitation low-fat milk product according to claim 5 consisting of about 48.5% sweet whey solids, 6.5% sodium caseinate, 27% corn syrup solids, 17% vegetable oil and 1% additives.

12. An imitation skim milk product according to claim 5 containing about 56% sweet whey solids, 7.5% sodium caseinate, 31.5% corn syrup solids, 5% vegetable oil and 1% additives.

13. An imitation whole milk product according to claim 5 containing about 41% sweet whey solids, 5.5% sodium caseinate, 22.5% corn syrup solids, 30% vegetable oil and 1% additives.

* * * * *